United States Patent
Beye (10) Patent No.: US 11,995,210 B2
(45) Date of Patent: May 28, 2024

(54) IDENTITY VAULT SYSTEM USING DISTRIBUTED LEDGERS FOR EVENT PROCESSING

(71) Applicant: Bank of America Corporation, Charlotte, NC (US)

(72) Inventor: Rick Beye, Highland Beach, FL (US)

(73) Assignee: Bank of America Corporation, Charlotte, NC (US)

(*) Notice: Subject to any disclaimer, the term of this patent is extended or adjusted under 35 U.S.C. 154(b) by 297 days.

(21) Appl. No.: 17/493,989

(22) Filed: Oct. 5, 2021

(65) Prior Publication Data
US 2023/0105171 A1    Apr. 6, 2023

(51) Int. Cl.
*G06F 21/62*    (2013.01)
*G06F 16/27*    (2019.01)
*G06F 21/60*    (2013.01)

(52) U.S. Cl.
CPC .......... *G06F 21/6245* (2013.01); *G06F 16/27* (2019.01); *G06F 21/602* (2013.01)

(58) Field of Classification Search
CPC .... G06F 21/6245; G06F 16/27; G06F 21/602; G06F 21/6254
See application file for complete search history.

(56) References Cited

U.S. PATENT DOCUMENTS

| | | | |
|---|---|---|---|
| 9,298,806 B1 | 3/2016 | Vessenes et al. | |
| 9,397,985 B1 | 7/2016 | Seger, II et al. | |
| 10,693,872 B1 * | 6/2020 | Larson | H04L 63/0861 |
| 11,271,908 B2 * | 3/2022 | Soundararajan | H04L 9/0643 |
| 11,615,349 B2 * | 3/2023 | Dutta | H04L 63/101 |
| | | | 705/50 |
| 2008/0086397 A1 | 4/2008 | Hahn-Carlson | |

(Continued)

FOREIGN PATENT DOCUMENTS

| | | | | |
|---|---|---|---|---|
| EP | 4050579 A1 * | 8/2022 | | A61B 5/015 |
| EP | 4050923 A1 * | 8/2022 | | G06F 16/2379 |
| WO | WO-2022111838 A1 * | 6/2022 | | |

OTHER PUBLICATIONS

Dec. 10, 2020—U.S. Office Action—U.S. Appl. No. 15/902,381.
Jun. 15, 2021—U.S. Office Action—U.S. Appl. No. 15/902,381.

*Primary Examiner* — Joseph P Hirl
*Assistant Examiner* — Thomas A Gyorfi
(74) *Attorney, Agent, or Firm* — Banner & Witcoff, Ltd.

(57) ABSTRACT

Aspects of the disclosure relate to identity protection in event processing. A computing platform may modify a first distributed ledger to include user PII. The computing platform may generate an internal token representative of an identity for the user and an external token that may be used to process an event between the user and a counter party without exposing any user identity. The computing platform may send the external token to a counter party system. The computing platform may receive, from the counter party system, event processing information. The computing platform may store the event processing information and the external token in a second distributed ledger. The computing platform may receive a request for the event processing information, and may identify the internal/external tokens using the first distributed ledger. The computing platform may identify, using the external token, the event processing information stored on the second distributed ledger.

20 Claims, 8 Drawing Sheets

(56) References Cited

U.S. PATENT DOCUMENTS

| | | | |
|---|---|---|---|
| 2010/0094735 | A1 | 4/2010 | Reynolds et al. |
| 2011/0161233 | A1 | 6/2011 | Tieken |
| 2013/0198851 | A1 | 8/2013 | Spies et al. |
| 2015/0112870 | A1 | 4/2015 | Nagasundaram et al. |
| 2016/0261404 | A1 | 9/2016 | Ford et al. |
| 2016/0292680 | A1 | 10/2016 | Wilson, Jr. et al. |
| 2017/0116608 | A1 | 4/2017 | Forzley et al. |
| 2017/0140375 | A1 | 5/2017 | Kunstel |
| 2017/0178237 | A1 | 6/2017 | Wong |
| 2018/0121918 | A1 | 5/2018 | Higgins |
| 2018/0288022 | A1* | 10/2018 | Madisetti ............ G06Q 20/3829 |
| 2019/0259026 | A1 | 8/2019 | Beye |
| 2020/0045020 | A1* | 2/2020 | Soundararajan ...... H04L 9/0643 |
| 2020/0074059 | A1* | 3/2020 | Beckett, Jr. ............. G06F 21/36 |
| 2021/0133701 | A1* | 5/2021 | Chen .................. G06Q 20/3821 |
| 2021/0365544 | A1* | 11/2021 | Malin ................... H04L 9/0819 |
| 2022/0263671 | A1* | 8/2022 | Liu ........................... H04L 9/50 |

* cited by examiner

IDENTITY VAULT SYSTEM USING DISTRIBUTED LEDGERS FOR EVENT PROCESSING

BACKGROUND

Aspects of the disclosure relate to identity protection. In some cases, a user identity or other personal/privacy information may be used to process transactions and/or other products, services, and/or events. In some instances, however, protecting personally identifiable information may be difficult with the deluge of data tracking technology that is used to capture transactional events arising out of human interactions. Accordingly, risk associated with protecting user personally identifiable information in a secure manner is increasing. It is therefore important to provide secure and reliable ways to store and protect this user information while enabling accountability for transactions.

SUMMARY

Aspects of the disclosure provide effective, efficient, scalable, and convenient technical solutions that address and overcome the technical problems associated with identity protection in event processing. In accordance with one or more embodiments of the disclosure, a computing platform comprising at least one processor, a communication interface, and memory storing computer-readable instructions may modify a first distributed ledger to include personal identifiable information (PII) for a user. The PII distributed ledger provider may have exclusive access to its secured contents and may be referred to as the identity vault provider. The computing platform may generate an internal token representative of an identity for the user on the PII ledger. The computing platform may generate a globally unique external token that may include the encrypted identity token, which may be used to process an event between the user and a counter party, such as a vendor, without exposing any identity of the user. Both the internal and external tokens may be added to the PII ledger for the user. The computing platform may send the external token to a counter party system as a component of the transaction. The external token may include the identity of the entity that created it and that is maintaining the PPI ledger for the user referenced by the external token. The computing platform may receive, from the counter party system, event processing information. The computing platform may store the event processing information including the external token in a second transactional distributed ledger. The computing platform may receive a request for the event processing information, wherein the request identifies the user on the PII ledger. The computing platform may identify the user's internal token and the related transaction's external token using the PII ledger. The computing platform may identify, using the external token, the related event processing information stored on the transactional ledger. The computing platform may send, to a user device, the event processing information and one or more commands directing the user device to display the event processing information, which may cause the user device to display the event processing information.

In one or more embodiments, modifying the first distributed ledger may include modifying the first distributed ledger to include one or more of: a birth certificate, a date of birth, a unique identification number such as a Social Security Number, a driver's license number or image, a biometric identifier, an address, a phone number, an email address, credit card information, or bank account information. In one or more embodiments, the internal token and/or the external token may include a time to live (TTL) component.

In one or more instances, the external token may include information that may be used to process the event.

In one or more instances, the second distributed ledger may be affiliated with a first type of event, including the event, and the computing platform may store additional distributed ledgers, each affiliated with a different type of event.

In one or more instances, the second distributed ledger may be provided by an entity independent of the entity providing the first distributed ledger.

In one or more instances, the second distributed ledger may be unencrypted in whole or in part.

In one or more instances, the second distributed ledger may be publicly available in whole or in part.

In one or more embodiments, identifying the internal or external token may include querying the first distributed ledger based on login credentials, and the PII may include the login credentials. In one or more embodiments, identifying the internal token may include identifying, using the first distributed ledger, a version of the internal or external token that was valid at a time the event was processed.

In one or more instances, identifying the event processing information may include querying the second distributed ledger based on the external token. In one or more instances, the computing platform may send, to the user device, the external token, which may be configured for storage at the user device, and the user device may be configured to present the external token to the counter party system to facilitate further event processing.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to an identity vault that may protect or otherwise conceal a user identity during transactions or other event processing. For example, described herein is a system that enables privacy protection through a split block chain data storage mechanism that assures authenticity and immutability for both identity and transactional events related to that identity. This privacy protection is based on separating storage of a person's identity and all related private information associated with that identity from the storage of any transaction event (e.g., a financial transaction event, a rendered service, a phone call made or received, a text message made or received, a tweet made or received, a library book checkout or return, a student's test result, a hotel reservation or stay, a ride share requested or taken, and/or other event). For example, information associated with the transaction event may include identification and storage of what was purchased, at what price including sales taxes paid, and/or other information.

Besides protecting personally identifying information as required under the laws of various jurisdictions, the systems and methods described herein enable significant economies in data mining as the dis-associated event data may be stored without encryption in a public cloud using block chain infrastructure, which may reduce the cost of compute in accessing, retrieving, and processing post storage. For example, hospitals and other service providers could share a public cloud block chain containing services transaction data all mapped to identities unknown to them since those identities may be preserved on an independent identity vault provider's block chain.

As a specific example, a person may receive testing, but the identity of the person receiving the test might not be known to the tester. Rather, a single use token may be provided by the identity vault provider to represent the identity of the person being tested to be stored as an attribute of one or more transactional events on the transactional block chain. The single use token may anonymously incorporate the reference to the person's identity, and that reference may only be decipherable to the identity vault provider. The test results may be reported via the single use token to the identity vault provider, who may then store the transactional information regarding the outcome of the event (e.g., test results, when the test was performed, what test mechanism was used, who performed the test, and/or other information) on a block chain in order to guarantee its accuracy and authenticity.

In some embodiments, only the identity vault provider may author an entry on the transactional block chain. There may be a single dedicated transactional block chain per person for a lifetime of transactional events or multiple ones scoped by geographic regions, transaction types, citizenship, and/or based on other information. The transactional block chain's globally unique identifier may be recorded on the identity vault provider's private, separate block chain that is dedicated to a user's personal identity and references to one or more transactional block chains related to that identity's transactions. In doing so, at least two separate block chains may be implemented. The block chain may be a critical component as it is an immutable recording (in indelible ink) that creates the accuracy and authenticity needed to make the whole process work (and properly retrievable information as a business record in various official capacities). Accordingly, the disclosure may enable individual privacy with full accountability of all parties.

In some instances, only the identity vault provider may be privileged to retrieve the information necessary to map an individual to their transactional recorded events. The exercise of that privilege may require the permission of the protected individual (e.g., their authenticated online query for items recorded on their transactional block chain ledgers).

In some instances, there may be a separate block chain for non-financial events, and another one for financial events that represent money moving between parties. There may be another block chain for ownership of things containing quantity, stock keeping unit (SKU), a serial number, and/or other information pertaining to goods purchased. There may be another block chain for services received such as a ride share ride between two global positioning system (GPS) coordinates. In some examples, only the vault provider may stitch the transactional events together by mapping them to the protected user's identity. In some examples, only the vault provider may provide the metadata for the when, where, and counter party of a recorded event as it relates to an individual. Life events such as marriage, divorce, child birth, and/or other events may also be included. Similarly, vital data and source of official documents, including document images such as a driver's license, passport, or the like may be stored on the identity vault provider's privacy block chain. Other data items stored on the privacy block chain may include fingerprints, retina scan, facial scan, deoxyribonucleic acid (DNA), and/or other biometrics used in identification. In these instances, such information may be collected only after receiving user consent to do so.

These and other features are described in further detail below.

Figure 1A:
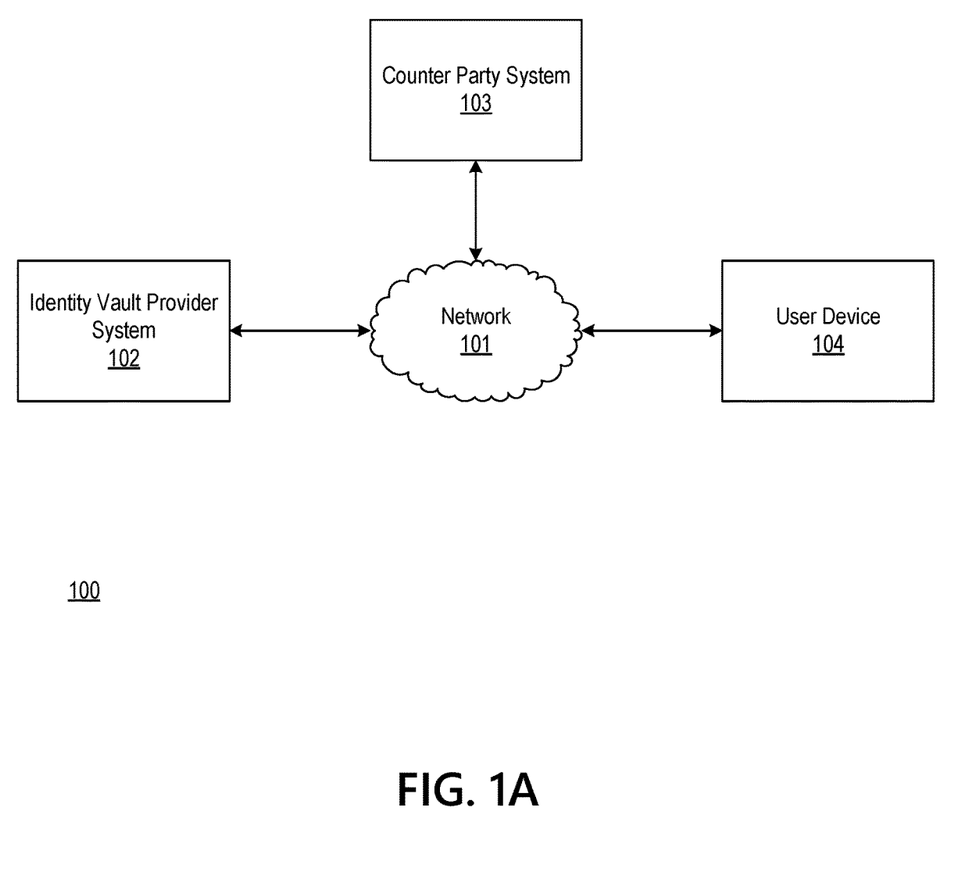
FIGS. 1A-1B depict an illustrative computing environment that uses distributed ledgers for identity protection in event processing in accordance with one or more example embodiments.
Figure 1B:
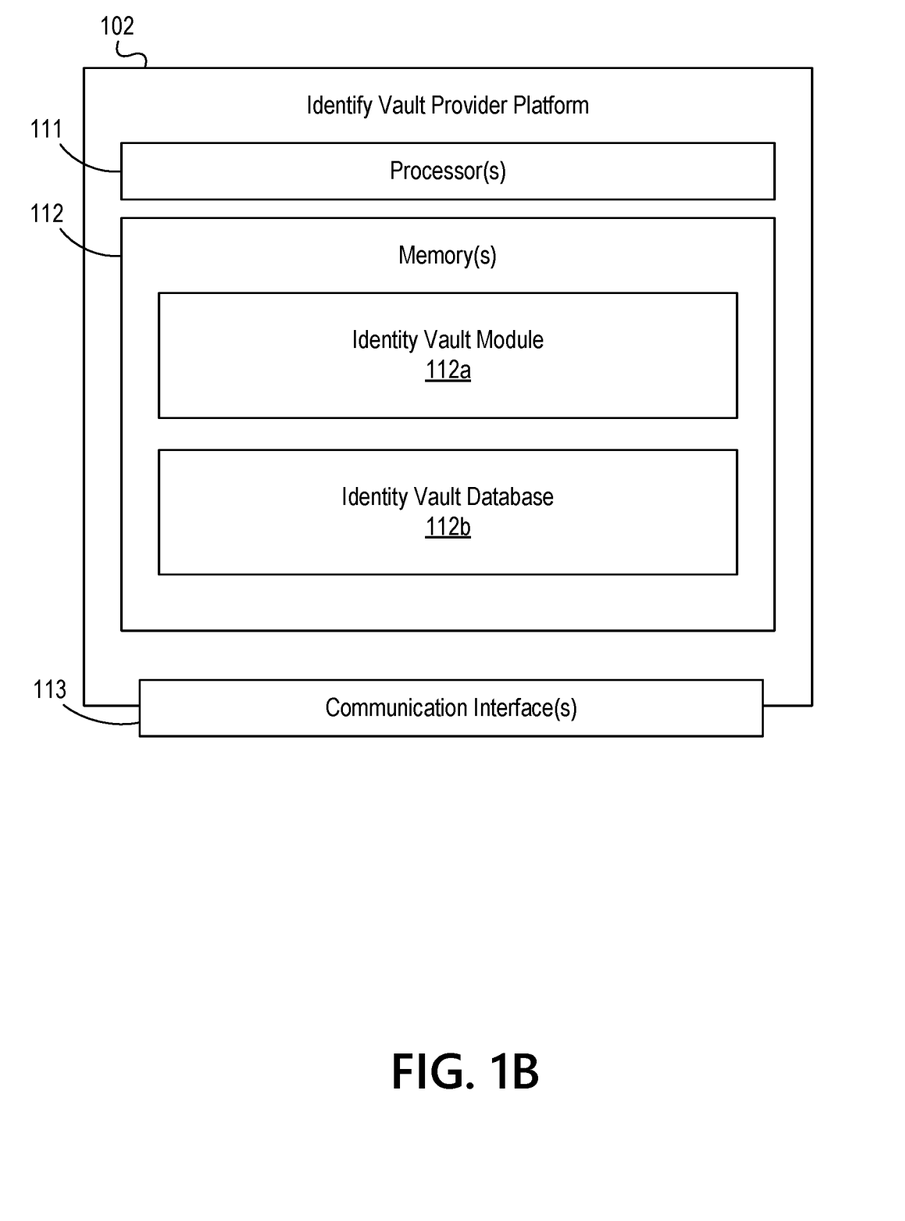

FIGS. 1A-1B depict an illustrative computing environment that uses distributed ledgers for identity protection in event processing in accordance with one or more example embodiments. Referring to FIG. 1A, computing environment 100 may include one or more computer systems. For example, computing environment 100 may include identity vault provider system 102, counter party system 103, and user device 104.

As described further below, identity vault provider system 102 may be a computer system that includes one or more computing devices (e.g., servers, server blades, or the like) and/or other computer components (e.g., processors, memories, communication interfaces) that may be used to establish, modify, and maintain distributed ledgers for identity protection in event processing.

Counter party system 103 may be a laptop computer, desktop computer, mobile device, tablet, smartphone, server, and/or other device that may be used by a vendor to process an event (e.g., execute a transaction or other event). In some instances, the counter party system 103 may host one or more distributed ledgers. In some instances, the counter party system 103 may be operated by an employee of the vendor. Although a single counter party system 103 is illustrated, any number of counter party systems may be implemented without departing from the scope of the disclosure.

User device 104 may be a laptop computer, desktop computer, mobile device, tablet, smartphone, wearable device, and/or other device that may be used by an individual to request event processing. In some instances, the user device 104 may be configured to store an external identity token that may be used to facilitate transactions/ event processing between the user device 104 and the counter party system 103 without exposing an identity of the user of the user device 104 to the vendor affiliated with the counter party system 103. Although a single user device 104 is illustrated, any number of user devices may be implemented without departing from the scope of this disclosure. In some instances, user device 104 may be configured to display one or more user interfaces (e.g., which may include historical event processing information requested by the user, or the like).

Computing environment 100 also may include one or more networks, which may interconnect identity vault provider system 102, counter party system 103, and/or user device 104. For example, computing environment 100 may include a network 101 (which may interconnect, e.g., identity vault provider system 102, counter party system 103, and/or user device 104).

In one or more arrangements, identity vault provider system 102, counter party system 103, and/or user device 104 may be any type of computing device capable of sending and/or receiving requests and processing the requests accordingly. For example, identity vault provider system 102, counter party system 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of identity vault provider system 102, counter party system 103, and/or user device 104 may, in some instances, be special-purpose computing devices configured to perform specific functions.

Referring to FIG. 1B, identity vault provider system 102 may include one or more processors 111, memory 112, and communication interface 113. A data bus may interconnect processor 111, memory 112, and communication interface 113. Communication interface 113 may be a network interface configured to support communication between identity vault provider system 102 and one or more networks (e.g., network 101, or the like). Memory 112 may include one or more program modules having instructions that when executed by processor 111 cause identity vault provider system 102 to perform one or more functions described herein and/or one or more databases that may store and/or otherwise maintain information which may be used by such program modules and/or processor 111. In some instances, the one or more program modules and/or databases may be stored by and/or maintained in different memory units of identity vault provider system 102 and/or by different computing devices that may form and/or otherwise make up identity vault provider system 102. For example, memory 112 may have, host, store, and/or include identity vault module 112a and/or identity vault database 112b.

Identity vault module 112a may have instructions that direct and/or cause identity vault provider system 102 to establish, modify, and/or otherwise maintain a privacy ledger and one or more event processing ledgers, as discussed in greater detail below. Identity vault database 112b may store information used by identity vault module 112a and/or identity vault provider system 102 in application of advanced techniques to establish, modify, and/or otherwise maintain a privacy ledger and one or more event processing ledgers, and/or in performing other functions.

Figure 2A:
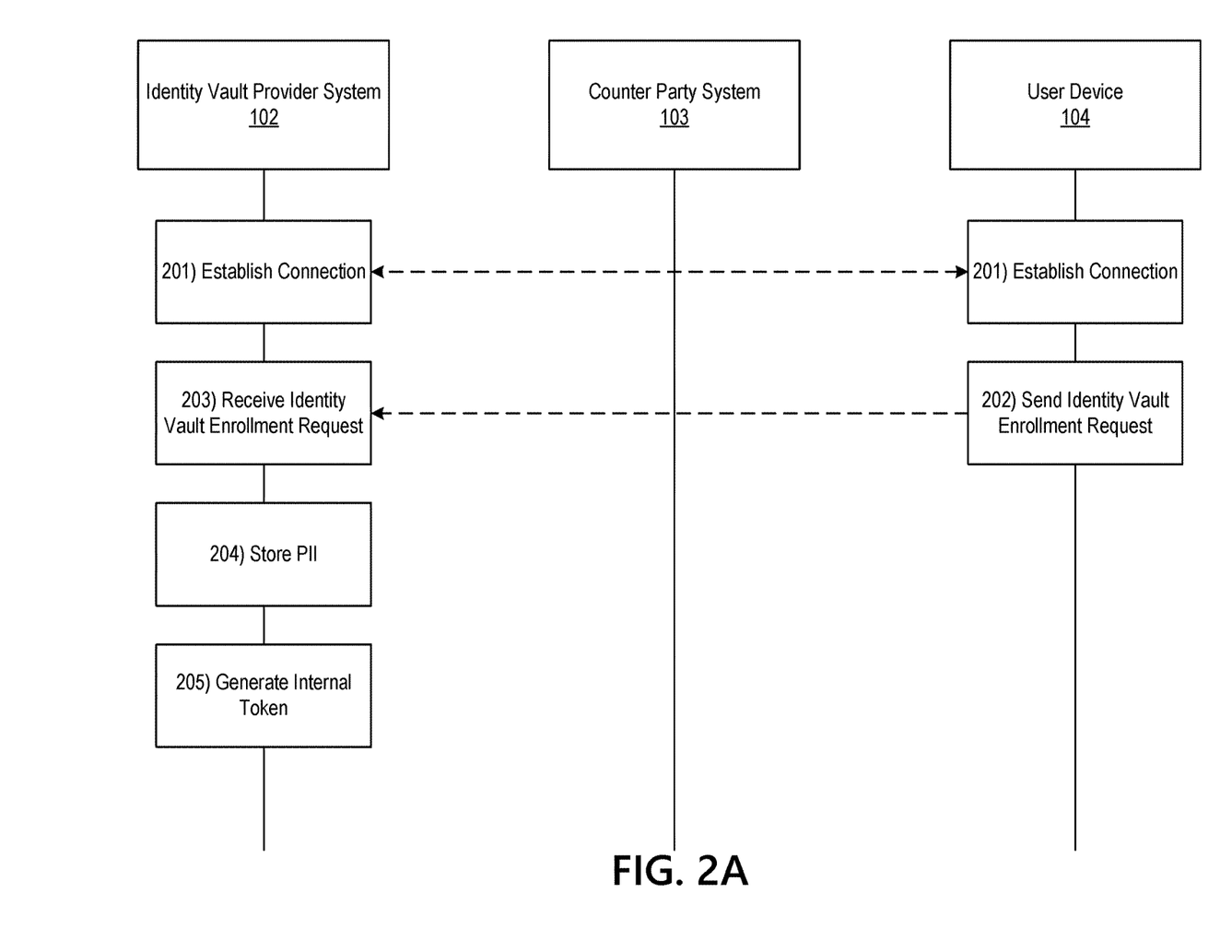
FIGS. 2A-2D depict an illustrative event sequence that uses distributed ledgers for identity protection in event processing in accordance with one or more example embodiments.

FIGS. 2A-2D depict an illustrative event sequence that uses distributed ledgers for identity protection in event processing in accordance with one or more example embodiments. Referring to FIG. 2A, at step 201, the user device 104 may establish a connection with the identity vault provider system 102. For example, the user device 104 may establish a first wireless connection with the identity vault provider system 102 to link the user device 104 with the identity vault provider system 102 (e.g., in preparation for sending a request to enroll in the identity vault service). In some instances, the user device 104 may identify whether or not a connection is already established with the identity vault provider system 102. If a connection is already established with the identity vault provider system 102, the user device 104 might not re-establish the connection. If a connection is not yet established with the identity vault provider system 102, the user device 104 may establish the first wireless data connection as described herein.

At step 202, the user device 104 may send an identity vault enrollment request to the identity vault provider system 102. For example, the user device 104 may send the identity vault enrollment request to the identity vault provider while the first wireless data connection is established. More specifically, the user device 104 may send a request to enroll in identity vault service provided by the identity vault provider system 102, which may, e.g., store personal identifiable information (PII) for the user and communicate with other third party systems to process events, conduct transactions, and/or perform other functions, on behalf of the user, without exposing the PII. In some instances, the user device 104 may send, along with the identity vault enrollment request, the PII. For example, the user device 104 may send a birth certificate, a date of birth, a unique identification number, an address, a phone number, an email address, credit card information, bank account information, and/or other PII.

At step 203, the identity vault provider system 102 may receive the identity vault enrollment request sent at step 202. For example, the identity vault provider system 102 may receive the identity vault enrollment request via the communication interface 113 and while the first wireless data connection is established.

At step 204, the identity vault provider system 102 may store the PII received at step 203. For example, the identity vault provider system 102 may store the PII in a first distributed ledger (e.g., a privacy information block chain) corresponding to the user. In some instances, to store the PII in the first distributed ledger, the identity vault providers system 102 may modify the first distributed ledger by hashing a previous block, and storing a new block that includes the hash and the PII. For example, all information arising out of the user's life events may be evaluated into PII deserving privacy protection (which may, e.g., be stored in the first distributed ledger) or mere transactional information (which may, e.g., be stored in a second distributed ledger as described below).

Each individual subscriber (e.g., including the user) to the identity vault service may be singularly identified on a private block chain (e.g., each user may have their own first distributed ledger), commencing, in some instances, at birth. In these instances, all of the user's PII may exist exclusively on this first distributed ledger such as all governmentally assigned information contained on the individual's birth certificate and subsequently as assigned during the individual's life time (e.g., unique identification number, driver's license, passport, and/or other PII) or commercially assigned information (e.g., bank account number, home address, work address, home phone, work phone, employer identifier, and/or other PII). In some instances, the PII may include time and/or position information driven by mobile device GPS data and a clock time at which the GPS data was recorded. It may also include facial recognition data. In these instances, such PII may be provided to/stored by the identity vault provider system 102 only upon receiving consent from the corresponding user.

At step 205, the identity vault provider system 102 may generate an internal token that may be used to represent the PII and/or otherwise identify the user without exposing the PII. In some instances, in generating the internal token, the identity vault provider system 102 may include a time to live (TTL) component that regenerates, rotates, and/or otherwise expires after a predetermined period of time. In some instances, in generating the internal token, the identity vault provider system 102 may generate a token that may be used to correlate event processing/transaction information stored on various event processing/transaction distributed ledgers with the first distributed ledger (e.g., the privacy block chain). In some instances, the identity vault provider system 102 may store the internal token in the first distributed ledger by modifying the first distributed ledger to include a new block that includes a hash of the previous block and the internal token. In some instances, the identity vault provider system 102 may originally establish the first distributed ledger using first PII (e.g., a birth certificate for the user) and may modify the first distributed ledger to include additional PII as it becomes available/is created (e.g., by hashing a previous block of the first distributed ledger and storing the hash along with the new PII).

In some instances, this internal token may be a connecting reference that associates the transactional information of the second distributed ledger (as described below) with an individual (such as the user), and is possessed exclusively by the identity vault provider system 102. As described below, the identity vault provider system 102 may record this internal token referentially via encryption and encapsulation within the external token with each transactional data event on the second distributed ledger.

Figure 2B:
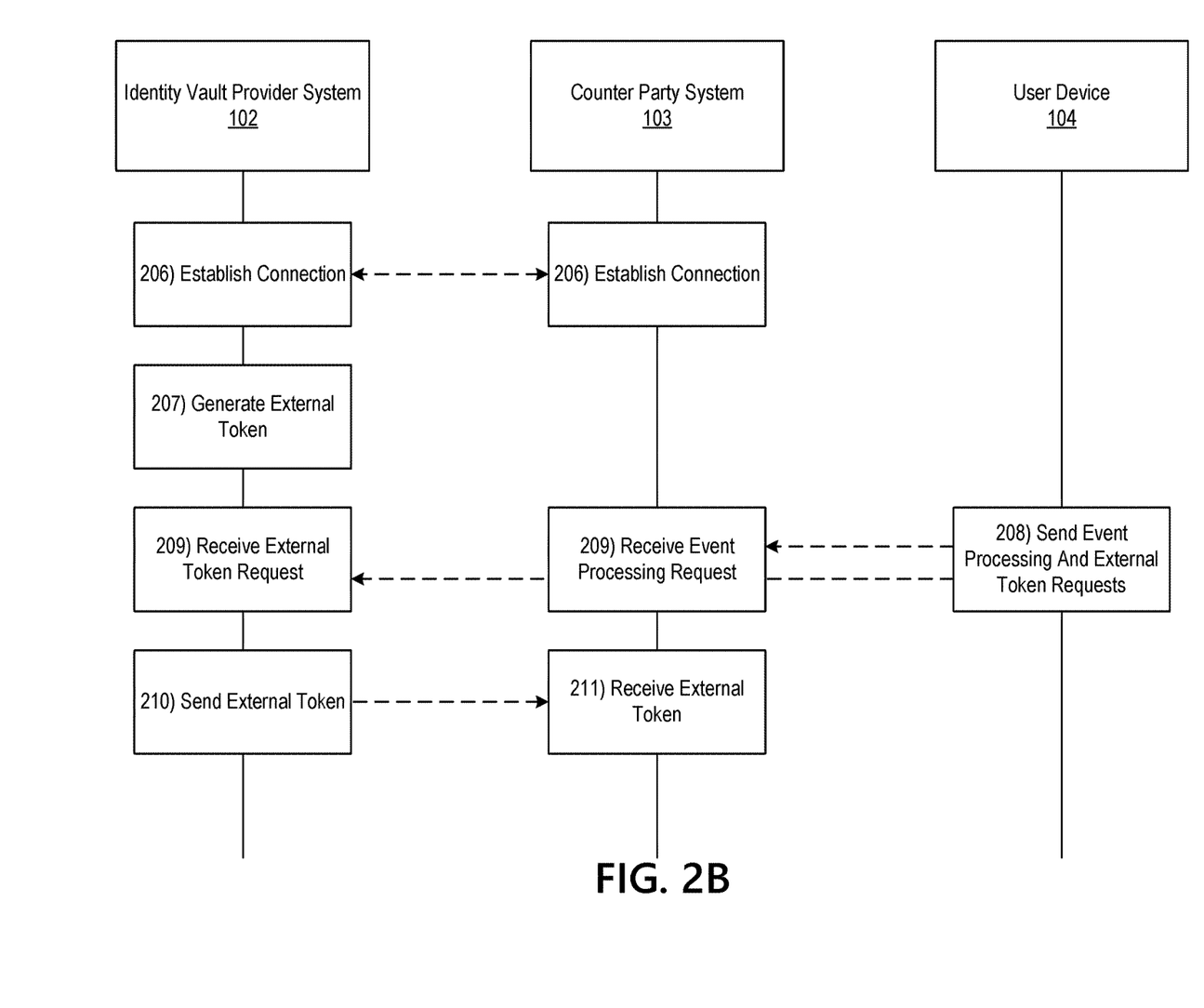

Referring to FIG. 2B, at step 206, the counter party system 103 may establish a connection with the identity vault provider system 102. For example, the counter party system 103 may establish a second wireless data connection with the identity vault provider system 102 to link the counter party system 103 to the identity vault provider system 102 (e.g., in preparation for receiving an external token). In some instances, the counter party system 103 may identify whether or not a connection is already established with the identity vault provider system 102. If a connection is already established with the identity vault provider system 102, the counter party system 103 might not re-establish the connection. If a connection is not yet established with the identity vault provider system 102, the counter party system 103 may establish the second wireless data connection as described herein.

At step 207, the identity vault provider system 102 may generate an external token that may be used by the counter party system 103 to process a requested event/transaction. For example, the external token may include the information needed to process the requested event/transaction, but might not include the PII or otherwise identify the user to the counter party system 103. In some instances, in generating the external token, the identity vault provider system 102 may generate a time to live (TTL) token that regenerates, rotates, and/or otherwise expires after a predetermined period of time. In some instances, the identity vault provider system 102 may generate the external token by encrypting or hashing the internal token. Additionally or alternatively, the identity vault provider system 102 may sign the external token using a certificate, a signature, and/or other credential. In some instances, once the external token is generated, the identity vault provider system 102 may send the external token to the user device 104, which may store the external token to facilitate transactions/event processing on behalf of the user with the counter party system 103. For example, the user device 104 may be configured to present the external token to the counter party system 103 to facilitate event processing.

In some instances, the identity vault provider system 102 may modify a second distributed ledger (e.g., a transaction/event processing blockchain) to include the external token.

In these instances, the identity vault provider system 102 may modify a distributed ledger that is distinct and/or otherwise isolated from the first distributed ledger. For example, the identity vault provider system 102 may hash a previous block of the second distributed ledger and store a new block that includes the hash and the external token.

In some instances, in generating the external token, the identity vault provider system 102 may issue an anonymous merchant payment token guaranteed for redemption by the identity vault provider system 102. In instances where the anonymous merchant payment token is used, the identity vault provider system 102 may record all other details regarding the goods or services purchased as extracted from the merchant's exchanged token. All information from the event that does not reveal identity may be stored in the second distributed ledger with the appropriate encrypted reference identifier. An example utility is the ability for the merchant to use the received transaction token to provide a recall notification promptly to the customer's identity vault provider identifying the SKU, serial number, and/or other information, including the external transaction token, concerning the recall. The identity vault provider may expeditiously deliver the notification to their subscriber without requiring the merchant or the manufacturer to know the purchaser's identifying information. In some instances, the identity vault provider may attest to the manufacturer that the user is entitled to the relief provided.

In some instances, this second distributed ledger may be used by the identity vault provider system 102 to record transactional data such as information arising out of a good or service purchase transaction (kind and price of good or service, data, location of purchase, selling merchant, stock keeping unit (SKU), serial number, type of resource used in making payment such as a credit card brand (which might not include the credit card number, as this number may be stored, for example, as PII in the first distributed ledger), and/or other transaction data).

At step 208, the user device 104 may send an event processing request to the counter party system 103. In some instances, the user device 104 may send the external token along with the event processing request (e.g., if the identity vault provider system 102 shared the external token with the user device 104). In other instances, where the user device 104 does not have the external token stored, it may send a request to the identity vault provider system 102 for the external token. For example, the user device 104 may send the event processing request, external token request, and/or external token while the first and/or second wireless data connections are established.

In some instances, in sending the event processing request to the counter party system 103, the user device 104 may receive login credentials (e.g., password, user name, and/or other credentials), which may link the user to their PII on the first distributed ledger. In some instances, in sending the event processing request, the user device 104 may send a request for a service, a phone call request, a text message request, a social media request, a library book checkout or return, a test, a hotel reservation request, a rideshare request, a request to execute a financial transaction, and/or otherwise process another event.

At step 209, the counter party system 103 may receive the event processing request and, in some instances, the external token. In some instances, the identity vault provider system 102 may receive the external token request. For example, the identity vault provider system 102 and/or counter party system 103 may receive the event processing request, external token request, and/or external token via the communication interface 113 and while the first and/or second wireless data connections are established. If the identity vault provider system 102 received an external token request, it may proceed to step 210. Otherwise, the event sequence may proceed to step 212.

At step 210, the identity vault provider system 102 may identify the external token for the user and send the external token to the counter party system 103. For example, the identity vault provider system 102 may identify the external token by identifying a correlation between the login credentials and the PII on the first distributed ledger, a correlation between the PII and the internal token on the first distributed ledger, and a correlation between the internal token and the external token on the second distributed ledger. In some instances, the identity vault provider system 102 may send the external token to the counter party system 103 via the communication interface 113 and while the second wireless data connection is established.

At step 211, the counter party system 103 may receive the external token from the identity vault provider system 102. For example, the counter party system 103 may receive the external token while the second wireless data connection is established.

Figure 2C:
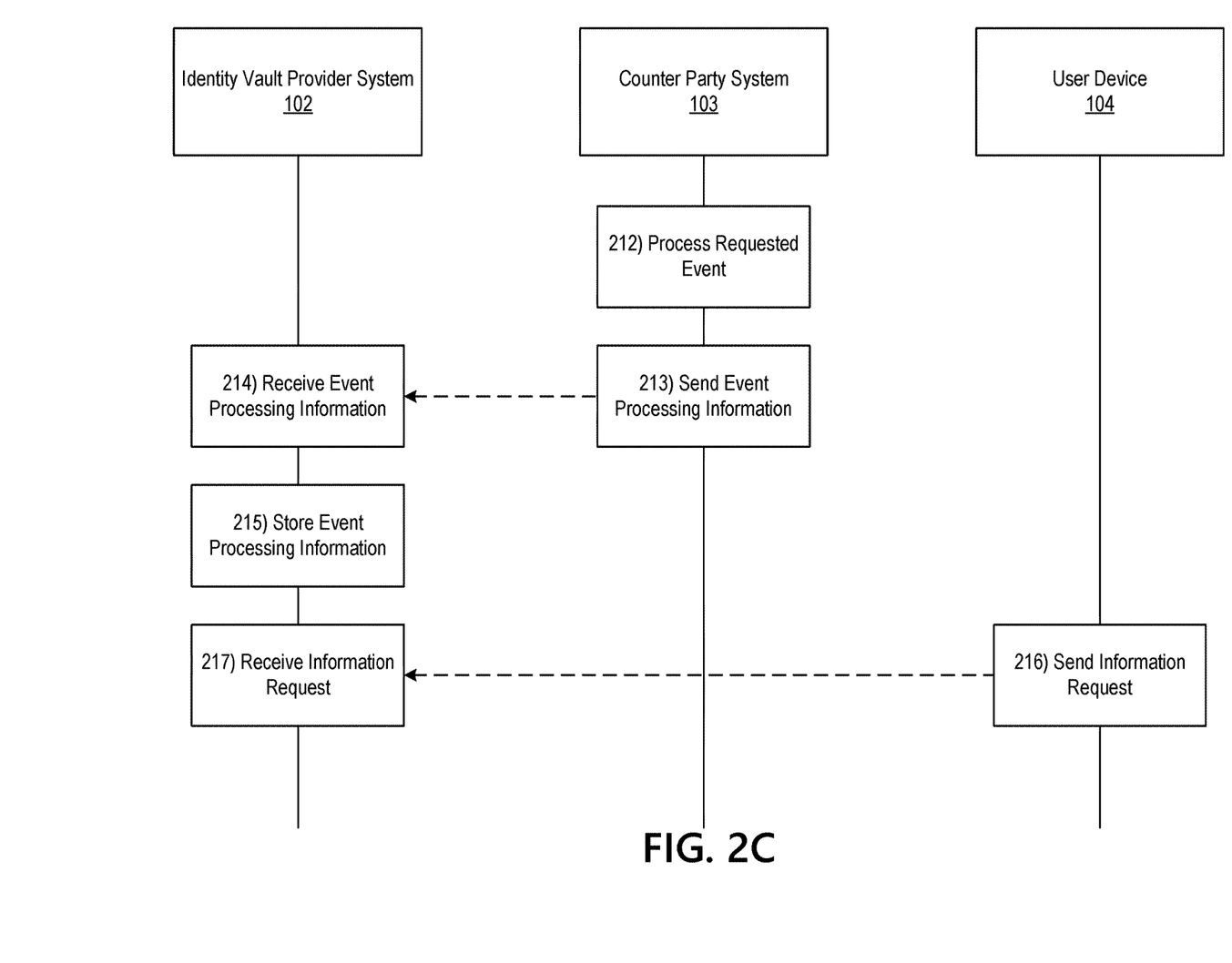

Referring to FIG. 2C, at step 212, the counter party system 103 may process the requested event. For example, the counter party system 103 may extract or otherwise access any necessary information to process the requested event from the external token. In these instances, the counter party system 103 might not be able to access an identity of the user (or the user's PII), because merely the external token is provided to the counter party system 103. In doing so, the user's identity may be protected or otherwise concealed from the vendor. In some instances, in processing the requested event, the counter party system 103 may execute/approve a requested service, establish a phone call, process a text message, process a social media message, process a checkout or return of a library book checkout or return, administer a test, process a hotel reservation, process a rideshare request, process/execute a financial transaction, and/or otherwise process an event.

In some instances, in processing the requested event, the counter party system 103 may record the event/transaction to a distributed ledger at the counter party system 103 (e.g., a transaction/event processing block chain). In doing so, however, the counter party system 103 might not store privacy/identity information for the user, because such information might not have been provided to the counter party system 103.

At step 213, the counter party system 103 may send event processing information (e.g., based on the event processed at step 212) to the identity vault provider system 102. In some instances, in sending the event processing information, the counter party system 103 may send an identification and storage of what was purchased, a price paid, product/service information, date/location of purchase, and/or other information related to the event/transaction. In some instances, the counter party system 103 may send the event processing information to the identity vault provider system 102 while the second wireless data connection is established.

At step 214, the identity vault provider system 102 may receive the event processing information sent at step 213. For example, the identity vault provider system 102 may receive the event processing information via the communication interface and while the second wireless data connection is established.

At step 215, the identity vault provider system 102 may store the event processing information received at step 214. For example, the identity vault provider system 102 may store the event processing information in the second distributed ledger (e.g., the event processing/transaction block chain). In doing so, the identity vault provider system 102 may store the event processing information along with the internal token and/or the external token. Accordingly, the identity vault provider system 102 may store the event processing information in a manner that isolates the event processing information (e.g., in the second distributed ledger) from the PII (e.g., which is stored in the first distributed ledger). Accordingly, the event processing information may be anonymously stored by the identity vault provider system 102 in a method that may allow the event processing information to be associated with the user and/or the user's PII using the internal token. In some instances, in storing the event processing information, the identity vault provider system 102 may hash a previous block of the second distributed ledger and store the hash and the event processing information in a new block of the second distributed ledger. In some instances, the identity vault provider system 102 may store one or more distributed ledgers (different from the first distributed ledger), each affiliated with or otherwise corresponding to a particular type of event (e.g., a particular type of transaction, industry, and/or other event). In some instances, the first distributed ledger may be isolated from any other distributed ledgers stored at the identity vault provider system 102.

At step 216, the user device 104 may send a request for the event processing information. For example, the user device 104 may request records and/or other information associated with the processed event/transaction. In some instances, the user device 104 may send the request for the event processing information while the first wireless data connection is established. In some instances, the user device 104 may send the request for the event processing information by logging into an account (e.g., using login credentials) or otherwise identifying the user.

At step 217, the identity vault provider system 102 may receive the information request sent at step 216. For example, the identity vault provider system 102 may receive the information request via the communication interface 113 and while the first wireless data connection is established.

Figure 2D:
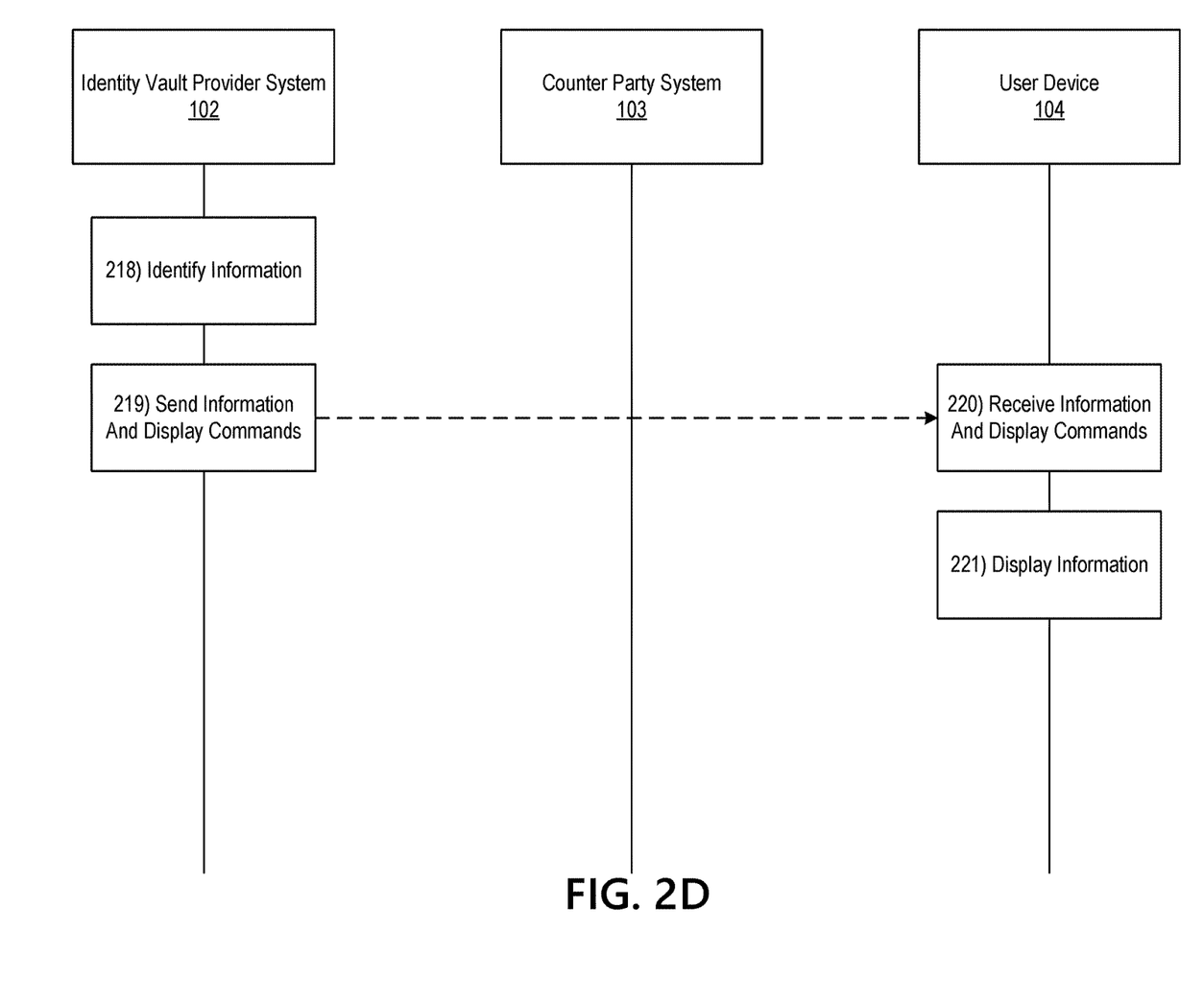

Referring to FIG. 2D, at step 218, the identity vault provider system 102 may identify the requested information. For example, using the received login credentials and the first distributed ledger (e.g., the privacy block chain), the identity vault provider system 102 may identify the internal token for the user. For example, the identity vault provider system 102 may query the first distributed ledger using the login credentials or other PII to identify the internal token. In these instances, the identity vault provider system 102 may identify a version of the internal token that was valid at the time the event corresponding to the requested information occurred. For example, the internal token may be a TTL token, and a first version of the internal token may be stored along with the requested information, which may be different than a second, current version of the internal token. To identify this version of the internal token, the identity vault provider system 102 may query the first distributed ledger using a time of the requested transaction to identify the internal token. Then, using the internal token, the external token and the second distributed ledger (e.g., the transaction/event processing block chain), the identity vault provider system 102 may identify the requested information. For example, the identity vault provider system 102 may query the second distributed ledger for the requested information using the external token (which may, e.g., be stored with the requested information). In doing so, the identity vault provider system 102 may access information for the user, while keeping their transaction/event processing information separate from any personal or privacy information, which may, e.g., be useful in identity protection.

At step 219, the identity vault provider system 102 may send the identified information to the user device 104. For example, the identity vault provider system 102 may send the information to the user device 104 via the communication interface 113 and while the first wireless data connection is established. In some instances, the identity vault provider system 102 may also send one or more commands directing the user device 104 to display the information.

At step 220, the user device 104 may receive the information sent at step 219. For example, the user device 104 may receive the information while the first wireless data connection is established. In some instances, the user device 104 may also receive the one or more commands directing the user device 104 to display the information.

Figure 4:
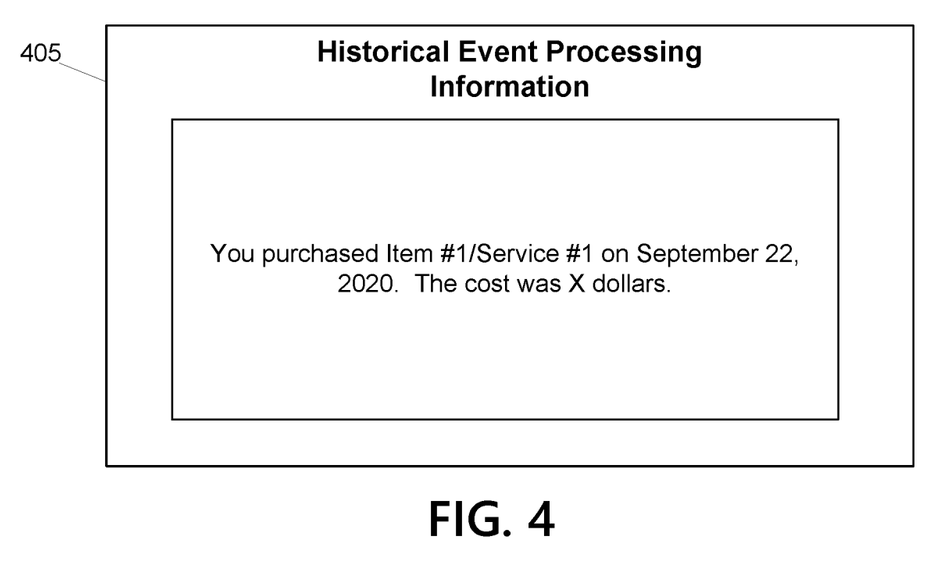
FIG. 4 depicts an illustrative graphical user interface that uses distributed ledgers for identity protection in event processing in accordance with one or more example embodiments.

At step 221, based on or in response to the one or more commands directing the user device 104 to display the information, the user device 104 may display the information. For example, the user device 104 may display a graphical user interface similar to graphical user interface 405, which is illustrated in FIG. 4.

Although the above described systems and methods primarily refer to transactional events, they may refer to the use/purchase of mobile devices without departing from the scope of the disclosure. For example, a subscriber might not purchase a cell phone in their individual name. Rather, the identity vault provider service may purchase the cell phone in the name of the identity vault provide service, and deliver the cell phone to the individual. In these instances, providing contact information to another person might not involve exchanging a phone number, name, address, or other PII, but rather may involve an exchange of an encrypted, event unique, token that may be signed by each respective vault provider's public key. To initiate a subsequent communication, the token stored on the recipient's device may be selected for opening a communication channel (e.g., voice, text, or other communication channel) and the token signature referencing the issuing vault provider may be used to initiate the connection through the vault's communication servers. If the token is valid, not expired, or blocked by revocation, the vault's communication servers may broker the communication channel preserving the identity and the location of the subscriber. The vault provider's application on the subscriber's cell phone may enable the subscriber to add attributes to the registering of any issued token as well as to the storing of any exchanged token such as a friendly name (e.g., person X from business Y). A merchant issued token may include a street address and GPS coordinates, while an individual issued token might not. The issuer of a vault communication token may decorate it as desired with additional information that might not be related to personal identification. One utility arising out of this implementation of the invention may be the prevention of spam calling because the spam caller might not possess a token to authenticate on the vault provider's communication servers. If the spammer tricked the individual into dispensing a vault provider's communication token, that token may be readily and permanently revoked upon first use at the direction of the subscriber.

Accordingly, the above described systems and methods may provide individual privacy protection while enabling a rich data set of anonymous data, which may be mined by various entities. Such human behavior data may reveal insights such as consumer purchasing trends, shifts in sentiment, dislocation of resources relative to consumption, and/or other insights. Furthermore, by using distributed ledger/block chain technology for data recording, data quality and absolute proof of the validity of what is recorded may be ensured.

With regard to the system and methods described above, a vault subscriber might not acquire ownership to any titled property. Rather, title may pass to and be recorded under the vault provider as a fiduciary trustee with the appropriate information stored on the subscriber's transaction block chain while preserving the ownership reference within the identity block chain. Occupancy, possession, or operation of the property may all be managed through vault provider supervision including recording the commencement and conclusion of such activities on the transactional block chain. One utility provided by such methods is the prevention of property theft or misuse since the vault may issue a permission to operate a token only to the subscriber or subscriber designees. For example, without the appropriate vault provided token presented to a vehicle when the vehicle negotiates operational identity via near field communication, the vehicle might not allow access or engine startup. Similarly, when an autonomous vehicle from a fleet of identical vehicles is called for transportation service, only an associated renter possessing the correct vault token may access their vehicle and consume a ride. In these instances, vehicle reservations may be handled through the vault provider as the vault provider may have exclusive access to the subscriber's GPS coordinates.

One example advantage of the bifurcated block chain approach is that without the PII on the transactional block chain, the transactional block chain may become a resource for information mining without invading anyone's privacy. Access to the transactional block chain may be free to governmental entities and the like while sold to others, such as manufacturers forecasting market demand for their products, the location of those markets, best locations to store inventory, and/or other information. In these instances, such access may be provided only upon receiving consent from the user associated with the data being accessed. The exposure of this rich data source across multiple vault providers may avoid economic waste throughout the economy.

Additionally, the systems and methods described herein may assist in compliance with government regulations, such as Health Insurance Portability and Accountability Act (HIPPA) requirements protecting privacy when a transaction relates to goods or services at the point of individual consumption. As a corollary, the consumer of those goods and services may amass a lifetime perfect record and control all access to it. The consumer subscriber may also post device based transactional measurements to the vault provider as another type of transactional information. The consumer may remain anonymous when providing the services provider with a transaction unique vault identifier token carrying an attribute to allow the provider access to view but no download their records for a prescribed period of time. Every such view may independently trigger another transactional event on both the service provider's and the consumer's respective transactional block chain.

A further utility of the systems and methods described herein is that the GPS trail stored on a subscriber's identity block chain may be searched for the intersection of location and time overlapping with another individual's similarly recorded trail. The other individual's trail may be readily available upon appropriate government request as the vault provider may only expose the trail and not the identity of the other individual. The other individual may anonymously release their trail information by contacting their vault provider. Accordingly, waste associated with the loss in economic productivity and/or other issues may be avoided.

Figure 3:
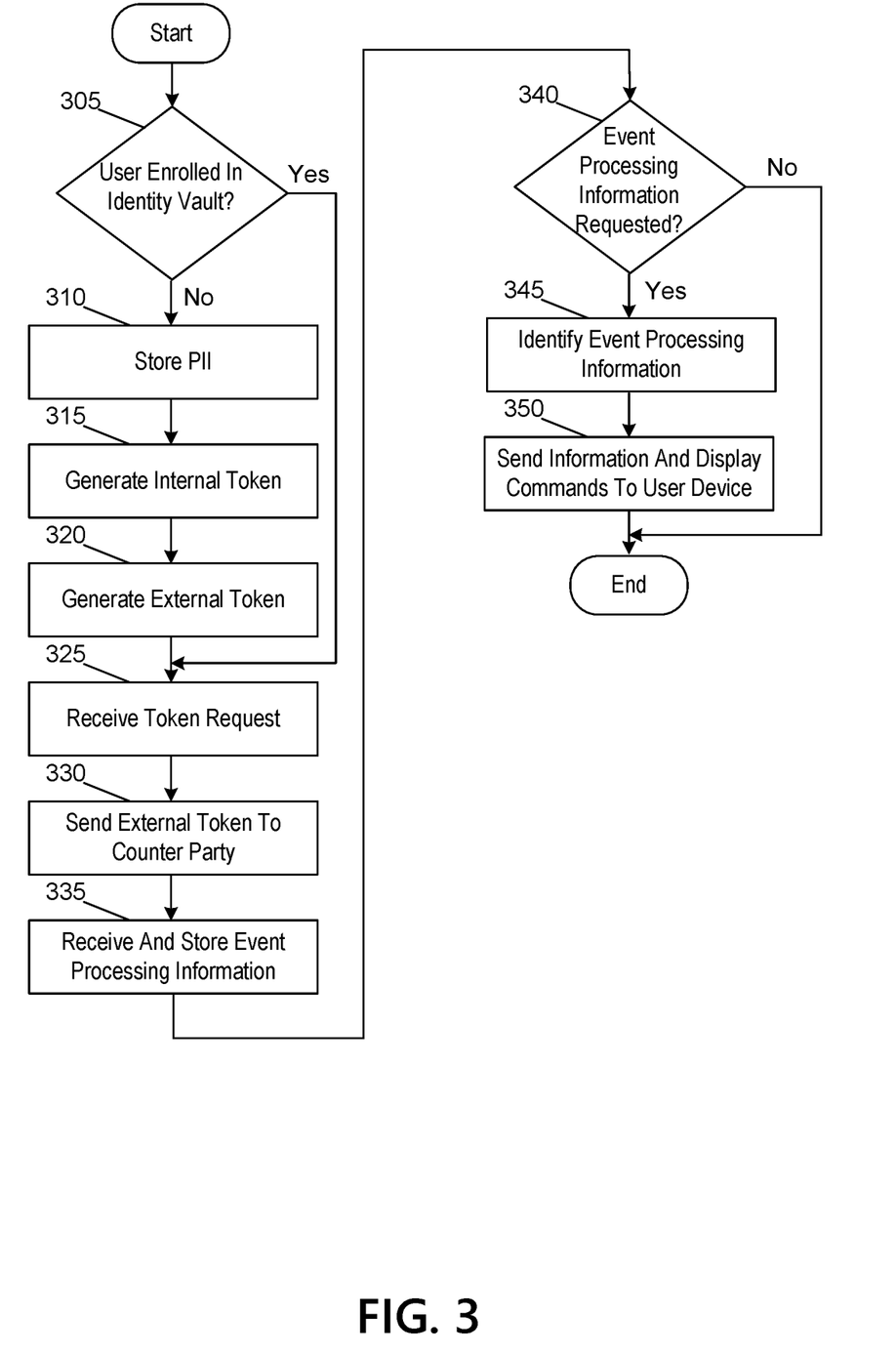
FIG. 3 depicts an illustrative method that uses distributed ledgers for identity protection in event processing in accordance with one or more example embodiments.

FIG. 3 depicts an illustrative method that implements distributed ledgers for identity protection in event processing in accordance with one or more example embodiments. Referring to FIG. 3, at step 305, a computing platform having at least one processor, a communication interface, and memory may identify whether a user is enrolled in an identity vault service. If so, the computing platform may proceed to step 325. Otherwise, the computing platform may proceed to step 310. At step 310, the computing platform may store PII, received from the user, in a first distributed ledger. At step 315, the computing platform may generate an internal token based on the PII. At step 320, the computing platform may generate an external token. At step 325, the computing platform may receive a request for the external token. At step 330, the computing platform may send the external token to a counter party system. At step 335, the computing platform may receive event processing information from the counter party system, and may store the event processing information in a second distributed ledger. At step 340, the computing platform may identify whether or not event processing information is requested. If not, the method may end. If so, the computing platform may proceed to step 345.

At step 345, the computing platform may identify event processing information to respond to the request by accessing the first and second distributed ledgers. At step 350, the computing platform may send information and one or more commands directing the user device to display the computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
    at least one processor;
    a communication interface communicatively coupled to the at least one processor; and
    memory storing computer-readable instructions that, when executed by the at least one processor, cause the computing platform to:
        modify a first distributed ledger to include personal identifiable information (PII) for a user, wherein information stored at the first distributed ledger is limited to the PII;
        generate an internal token representative of an identity for the user;

generate an external token that may be used to process an event between the user and a third party without exposing an identity of the user;
send the external token to a counter party system;
receive, from the counter party system, event processing information;
store the event processing information and the external token in a second distributed ledger, wherein information stored at the second distributed ledger is limited to non-PII;
receive a request for the event processing information, wherein the request identifies the PII for the user;
identify, using the PII for the user, the internal token and the external token, wherein identifying the internal token and the external token comprises:
identifying, on the first distributed ledger, a correlation between login credentials for the user and the PII,
identifying, on the first distributed ledger, a correlation between the PII and the internal token, and
identifying, on the second distributed ledger, a correlation between the internal token and the external token;
identify, using the external token, the event processing information; and
send, to a user device, the event processing information and one or more commands directing the user device to display the event processing information, wherein sending the one or more commands directing the user device to display the event processing information causes the user device to display the event processing information.

2. The computing platform of claim 1, wherein modifying the first distributed ledger comprises modifying the first distributed ledger to include one or more of: a birth certificate, a date of birth, a unique identification number, a biometric identifier, an address, a phone number, an email address, credit card information, or bank account information.

3. The computing platform of claim 1, wherein one or more of: the internal token or the external token include a time to live (TTL) component.

4. The computing platform of claim 1, wherein the external token comprises information that may be used to process the event.

5. The computing platform of claim 1, wherein the second distributed ledger is affiliated with a first type of event, including the event, and wherein the computing platform stores additional distributed ledgers, each affiliated with a different type of event.

6. The computing platform of claim 1, wherein the second distributed ledger is isolated from the first distributed ledger.

7. The computing platform of claim 1, wherein identifying the internal token comprises querying the first distributed ledger based on login credentials, and wherein the PII includes the login credentials.

8. The computing platform of claim 7, wherein identifying the internal token comprises identifying, using the first distributed ledger, a version of the internal token that was valid at a time the event was processed.

9. The computing platform of claim 1, wherein identifying the event processing information comprises querying the second distributed ledger based on the internal token.

10. The computing platform of claim 1, wherein the memory stores additional computer-readable instructions that, when executed by the at least one processor, cause the computing platform to:
send, to the user device, the external token, wherein the external token is configured for storage at the user device, and wherein the user device is configured to present the external token to the counter party system to facilitate further event processing.

11. The computing platform of claim 1, wherein the event processing information corresponds to a purchase of a mobile phone, and wherein providing contact information, corresponding to the mobile phone, comprises providing an encrypted token corresponding to the mobile phone rather than the contact information itself.

12. The computing platform of claim 1, wherein the second distributed ledger stores location and time information for the user, and wherein sending the event processing information to the user device comprises sending the location and time information without releasing an identity of the user.

13. A method comprising:
at a computing platform comprising at least one processor, a communication interface, and memory:
modifying a first distributed ledger to include personal identifiable information (PII) for a user, wherein information stored at the first distributed ledger is limited to the PII;
generating an internal token representative of an identity for the user;
generating an external token that may be used to process an event between the user and a third party without exposing an identity of the user;
sending the external token to a counter party computer system;
receiving, from the counter party computer system, event processing information;
storing the event processing information and the external token in a second distributed ledger, wherein information stored at the second distributed ledger is limited to non-PII;
receiving a request for the event processing information, wherein the request identifies the PII for the user;
identifying, using the PII for the user, the internal token and the external token, wherein identifying the internal token and the external token comprises:
identifying, on the first distributed ledger, a correlation between login credentials for the user and the PII,
identifying, on the first distributed ledger, a correlation between the PII and the internal token, and
identifying, on the second distributed ledger, a correlation between the internal token and the external token;
identifying, using the external token, the event processing information; and
sending, to a user device, the event processing information and one or more commands directing the user device to display the event processing information, wherein sending the one or more commands directing the user device to display the event processing information causes the user device to display the event processing information.

14. The method of claim 13, wherein modifying the first distributed ledger comprises modifying the first distributed ledger to include one or more of: a birth certificate, a date of birth, a unique identification number, a biometric identifier, an address, a phone number, an email address, credit card information, or bank account information.

15. The method of claim 13, wherein one or more of: the internal token or the external token include a time to live (TTL) component.

16. The method of claim 13, wherein the external token comprises information that may be used to process the event.

17. The method of claim 13, wherein the second distributed ledger is affiliated with a first type of event, including the event, and wherein the computing platform stores additional distributed ledgers, each affiliated with a different type of event.

18. The method of claim 13, wherein the second distributed ledger is isolated from the first distributed ledger.

19. The method of claim 13, wherein identifying the internal token comprises querying the first distributed ledger based on login credentials, and wherein the PII includes the login credentials.

20. One or more non-transitory computer-readable media storing instructions that, when executed by a computing platform comprising at least one processor, a communication interface, and memory, cause the computing platform to:
- modify a first distributed ledger to include personal identifiable information (PII) for a user, wherein information stored at the first distributed ledger is limited to the PII;
- generate an internal token representative of an identity for the user;
- generate an external token that may be used to process an event between the user and a third party without exposing an identity of the user;
- send the external token to a counter party computer system;
- receive, from the counter party computer system, event processing information;
- store the event processing information and the external token in a second distributed ledger, wherein information stored at the second distributed ledger is limited to non-PII;
- receive a request for the event processing information, wherein the request identifies the PII for the user;
- identify, using the PII for the user, the internal token and the external token, wherein identifying the internal token and the external token comprises:
  - identifying, on the first distributed ledger, a correlation between login credentials for the user and the PII,
  - identifying, on the first distributed ledger, a correlation between the PII and the internal token, and
  - identifying, on the second distributed ledger, a correlation between the internal token and the external token;
- identify, using the external token, the event processing information; and
- send, to a user device, the event processing information and one or more commands directing the user device to display the event processing information, wherein sending the one or more commands directing the user device to display the event processing information causes the user device to display the event processing information.

* * * * *